Sept. 16, 1969  R. FERGUSON  3,467,153
INDEXING METHOD AND MEANS FOR TUBULAR SAWING
Filed Aug. 28, 1967  3 Sheets-Sheet 1

INVENTOR
RICHARD FERGUSON
BY
Channing C. Richards &
Dalbert U. Shefte
ATTORNEYS

Sept. 16, 1969  R. FERGUSON  3,467,153
INDEXING METHOD AND MEANS FOR TUBULAR SAWING
Filed Aug. 28, 1967  3 Sheets-Sheet 2

INVENTOR
*RICHARD FERGUSON*
BY
Channing P. Richards &
Dalbert U. Shefte
ATTORNEYS Sept. 16, 1969 R. FERGUSON 3,467,153
INDEXING METHOD AND MEANS FOR TUBULAR SAWING
Filed Aug. 28, 1967 3 Sheets-Sheet 3
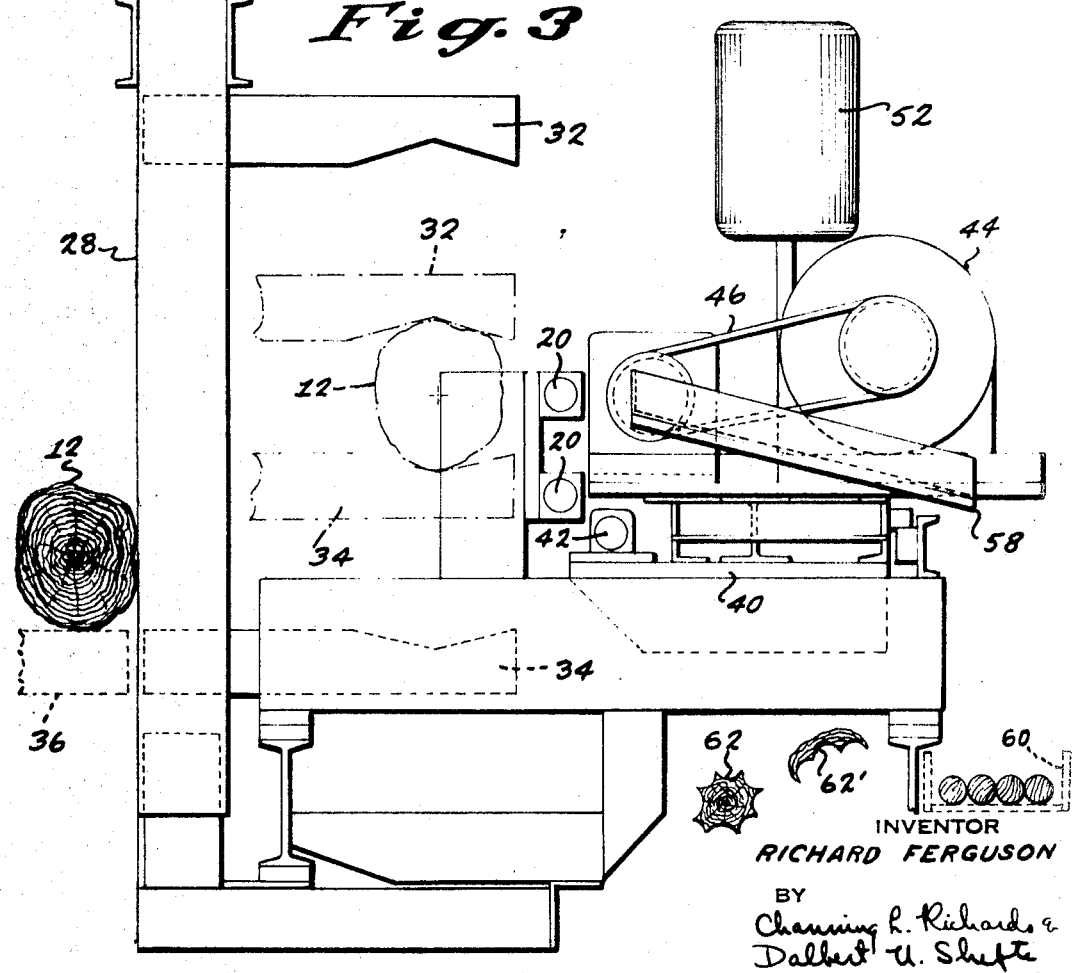
INVENTOR
RICHARD FERGUSON

United States Patent Office 3,467,153
Patented Sept. 16, 1969

3,467,153
INDEXING METHOD AND MEANS FOR TUBULAR SAWING
Richard Ferguson, Charlotte, N.C., assignor to Terleco, Inc., Charlotte, N.C., a corporation of North Carolina
Filed Aug. 28, 1967, Ser. No. 663,823
Int. Cl. B27b 33/18
U.S. Cl. 143—85          5 Claims

ABSTRACT OF THE DISCLOSURE

A method and means for selecting the successive positions at which a workpiece should be indexed incident to tubular sawing of cylindrical billets therefrom; the selection being made in relation to a visible indication superimposed at an end face of the workpiece to delineate the true location and width of kerf to be formed during a following tubular sawing stroke, so that indexing of the workpiece may be remotely controlled in visual reference to the superimposed indication without parallax difficulty.

BACKGROUND OF THE INVENTION

The invention is concerned with the production of cylindrical wooden billets by tubular sawing. U.S. Patents No. 3,163,190 and No. 3,207,191 disclose tubular sawing apparatus by which such billets may be produced from log sections by supporting a log section workpiece on an axis spaced parallel to the tubular sawing axis, and by providing for selective shifting of the supported workpiece both laterally with the support axis in relation to the sawing axis and rotatively about the support axis for indexing to selected successive positions for sawing; while U.S. Patent No. 3,344,820, issued Oct. 3, 1967, discloses an improved index controlling means for such apparatus by which a constant extent of workpiece indexing about the support axis may be maintained at any spacing of the support axis in relation to the sawing axis.

Effective indexing control of the workpiece is needed in tubular sawing operations for several reasons. An obvious first consideration is the matter of maintaining acceptable production rates, which is difficult unless proper positioning of the workpiece for successive sawing strokes can be managed readily and rapidly. Proper positioning of the workpiece, however, must take into account the necessity of providing an avenue for kerf chip escape, which may be done by causing the kerf formed during a following tubular sawing stroke to intersect the void left by a preceding stroke, but which means that the indexing for the following stroke must be done in relation to the preceding one. Additionally, when log sections are used for workpieces, there are characteristic variations in diametric size and irregularity of outline, as well as the occurrence of knots and other imperfections within the cross section, which require indexing accommodation in order to cut sound billets regularly.

The index controlling means of the above-noted U.S. Patent No. 3,344,820 deals effectively with all of the foregoing considerations and operates exceptionally well. However, the control means of that patent is basically arranged for maintaining a constant extent of rotative indexing to provide for kerf chip escape through intersecting location of successive kerfs as previously mentioned, and while this constant indexing extent may be overridden at will as occasion requires, there is advantage under some circumstances in providing greater flexibility in this respect, as when the log section workpieces are of a sort that require more than usual indexing accommodation to outline irregularity and internal imperfection. Also, a simpler provision for indexing is a desirable alternative, and the present invention is characterized by both simplicity and flexibility in indexing control.

SUMMARY OF THE INVENTION

Briefly described, the present invention provides for superimposing at an end face of a workpiece supported for tubular sawing a visible indication of the true location and width of kerf to be formed during a following tubular sawing stroke, and using this superimposed indication as a visual reference for remotely controlling the selective shifting of the workpiece for index positioning from the operating station of the tubular sawing apparatus.

By superimposing the indication of kerf location at the workpiece end face, the possibility of parallax distortion incident to visual reference from the operating station is eliminated, and this remains true whether or not the workpiece end face is square with the support axis or entirely smooth. Means for superimposing the indication of kerf location can be provided in a number of ways. Mechanical means such as a pair of rods arranged for extension to the workpiece end face, so as to ride endwise thereat, can be positioned and proportioned to indicate both the width of kerf and its location, although any such mechanical means must include provision for retraction or displacement clear of the tubular saw when it cuts through the workpiece end face during the following sawing stroke, and this will usually involve more structural complication than is desirable.

Alternatively, a system of mirrors can be trained in alignment with the sawing axis for viewing from the operating station through an eyepiece fitted with a suitable reticle for indicating the kerf location and width in superimposed relation to the mirrored image of the workpiece end face, but an arrangement of this sort requires indirect sighting by the operator in controlling the indexing and has the consequent disadvantage of making it more difficult for him to take into account the overall condition of the workpiece end face in controlling the index positioning.

The preferred indicating means for use according to the present invention is a pair of light projecting units, of the type casting a beam that delivers a linear zone of lighting contrast, disposed so that the beams from the respective units are cast on the workpiece end face to cross the resulting linear contrast zones thereon, as described further below in connection with the accompanying drawings.

DESCRIPTION OF THE DRAWINGS

FIG. 3 is a right end elevation corresponding to FIG. 1;
and
FIG. 4 is an enlarged diagrammatic detail illustrating the reference arrangement for indexing as seen from the left in FIG. 1.

DESCRIPTION OF THE PREFERRED EMBODIMENT

Figure 1:
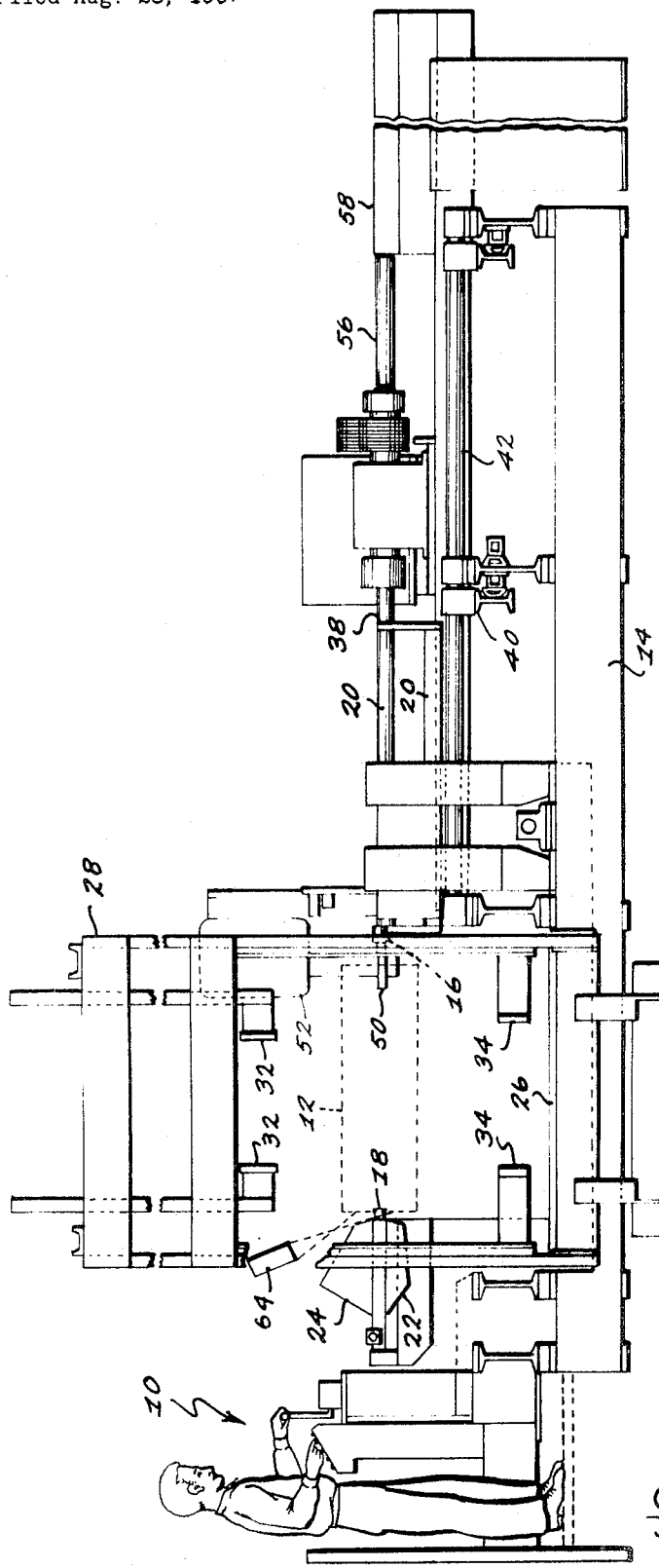
FIG. 1 is a side elevation of a tubular sawing apparatus equipped for operation in accordance with the present invention.
Figure 2:
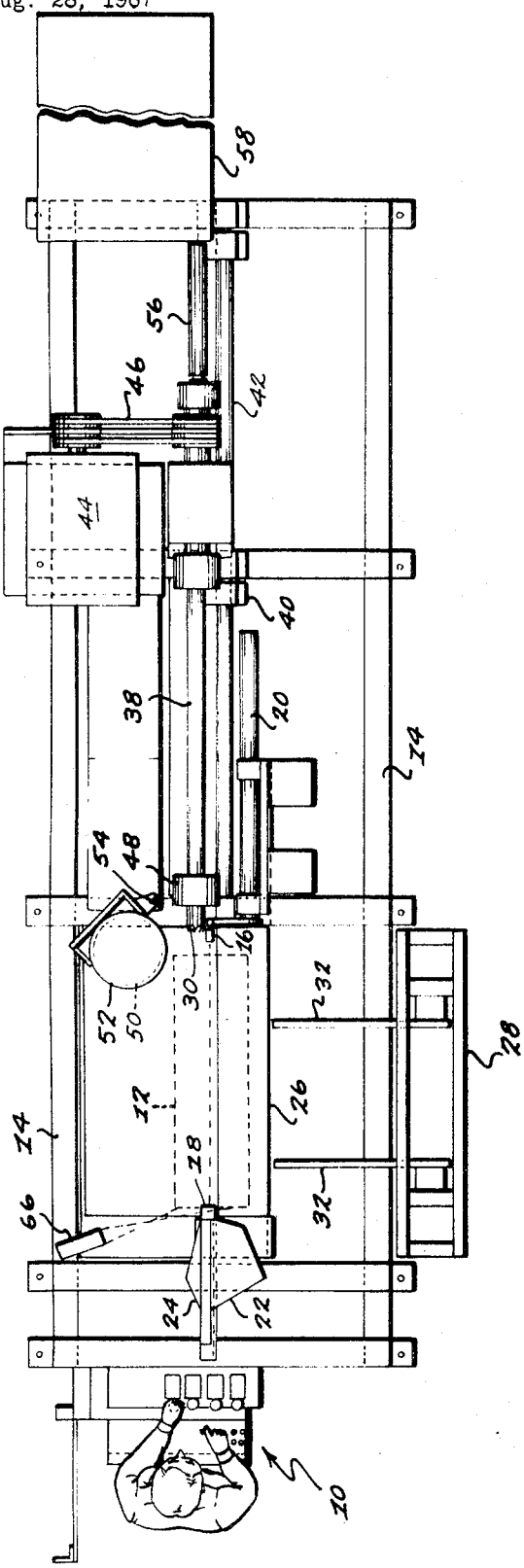
FIG. 2 is a plan view corresponding to FIG. 1.

In FIGS. 1 and 2, the reference numeral 10 indicates generally an operating station at which an operator is positioned for remotely controlling the illustrated apparatus to cut cylindrical wooden billets from a log section supported for this purpose at the position indicated by the dotted outline at 12.

The apparatus proper comprises a frame structure erected on base elements 14 to carry aligned chucks 16 and 18 which define the support axis about which the log section 12 is indexed for tubular sawing. The chuck 16 is provided with a mounting that includes slide rods 20 so that it may be shifted longitudinally for opening and closing to drop a spent log section and receive a fresh one. The other log chuck 18 is fixed and has a holding dog 22 and indexing dog 24 arranged thereat for alternately holding a log section 12 at a selected position for tubular sawing and then rotating it about the support axis to a new position for the next sawing stroke. These holding and indexing dogs 22 and 24 correspond to those disclosed in the previously mentioned U.S. Patent No. 3,344,820 and are arranged for operation in the same way, except that the mechanical control of indexing extent described by that patent is not employed according to the present invention.

All of the mechanism associated in the above-indicated manner with the movable and fixed log chucks 16 and 18 is disposed on a carriage 26 that is mounted in turn on the frame structure for shifting laterally thereof so that the support axis defined by the chucks 16 and 18 may be moved into position with respect to a log loading device 28 (see FIG. 3), as well as remaining selectively shiftable in relation to the axis on which the tubular saw 30 operates.

The log loader 28 is of the type disclosed in the earlier noted Patent No. 3,163,190, having upper and lower pairs of positioning arms 32 and 34 articulated through an equalizing rack arrangement so that they may be spread sufficiently to move the lower arm pair 34 downwardly to the level of a feed conveyor 36 to take a log section 12 therefrom, and then closed to elevate the log section and grip it in a generally centered manner (as indicated by the dotted line illustration in FIG. 3) for pick-up by the log chucks 16 and 18 upon shifting of the chuck carriage 26 into position therefor.

After a log section 12 has been picked up from the loading device 28 in this manner, and the positioning arms 32 and 34 spread again to clear the chucked log section, the chuck carriage is then shifted to dispose the log section in the path of the tubular saw 30 for the cutting of billets therefrom. The tubular saw 30 is situated at the head of an elongated tubular member 38, which is mounted for rotation on a carriage structure 40 slidably riding on guide rods 42 carried by the frame structure to allow working and recovery strokes of the tubular saw 30 along its axis.

The saw carriage 40 supports a drive motor 44 connected by suitable belting or the like as at 46 for rotating the saw tube 38 and the cutting head 30 thereon, and an outward bearing 48, through which the saw tube 38 is slidable, is fixed on the frame structure adjacent the tubular saw head 30 to steady and guide its extension and retraction. Also arranged on the saw carriage 40 is a slotting saw 50 and drive motor 52 therefor, which are pivoted as a unit (at 54) for swinging into position to cut a kerf chip escape slot ahead of the tubular saw 30 wherever this is necessary. Both of the Patents No. 3,163,190 and No. 3,207,191 referred to above disclose slotting saw arrangements of this sort.

As billets are cut from a chucked log section 12 on each working stroke of the tubular saw 30, the cut billets are received within the saw tube 38 and are progressively displaced toward the rear end during succeeding working strokes. Upon emerging from the rear end of saw tube 38 the billets enter a fixed ejector tube 56 when the saw carriage recovers to its retracted position, and this ejector tube 56 will take the emerged billet from the saw tube 38 when it proceeds on its next working stroke. Repetition of this transfer when the next billet emerges will cause displacement of the preceding billet through the ejector tube 56 so that a progressive delivery of the cut billets is effected onto a sloping chute structure 58 from which the billets roll into an output conveyor as indicated at 60 in FIG. 3, while the kerf chips and offal falls away, as at 62 and 62' to a waste conveyor (not shown).

Hydraulic means are best adapted for actuating the various motions required for the tubular sawing operations just described, but however the actuation is accomplished the very number of the motions needed makes it necessary to provide a quite sophisticated set of controls at the operating station 10, and this means that the operating station 10 should be located so that the operator is placed at a good vantage point for overall view of the apparatus as he controls its operation, which in turn means a location that is remotely situated in relation to a log section 12 being cut and from which any sighting of the alignment of the tubular saw 30 for the cutting is subject to parallax distortion.

The present invention makes it possible, nevertheless, to control the positioning and indexing of the log section 12 for tubular sawing readily by superimposing at the surface of the adjacent log section end face a visible indication of the location and width of kerf that will be formed during a following tubular sawing stroke. As noted earlier, the preferred arrangement for this purpose employs a pair of light projecting units of the type casting a beam that delivers a linear zone of lighting contrast. Projecting units of this sort are disclosed, for example, in U.S. Patent No. 1,953,299 and No. 2,291,152, and are indicated in FIGS. 1 and 2 arranged at 64 and 66, respectively, for use according to the present invention.

Such projecting units 64 and 66 are available in alternative forms to cast the linear zone of lighting contrast they project either as a shadow or as a zone of intensified light, and in either case a desired zone width can be projected and the linear extent can be selected either by using an elongated type of unit or by angling the unit in relation to the projection surface, as illustrated in FIGS. 1 and 2.

FIG. 4 indicates diagrammatically the manner in which the projecting units 64 and 66 serve to guide the indexing of a log section 12 for tubular sawing. It will be seen from FIGS. 1 and 2 that the units 64 and 66 are arranged to superimpose the lighting zones they cast at the log section end face adjacent the operating station 10, which the operator may view from an elevated position. This end face in view is the one opposite that at which the tubular saw 30 starts its working stroke, so that the point of attack of the saw 30 on the log section 12 is actually hidden from the operator and he must be provided with some means for aligning the saw position effectively.

The projecting units 64 and 66 serve this purpose by respective coordinate disposition so that they cast the lighting zones they project in crossing fashion, as at 64' and 66' in FIG. 4, on the log section end face in alignment with the kerf 30' to be formed during a following tubular sawing stroke. By arranging the projecting units 64 and 66 coordinately so that one guide zone 64' runs vertically and the other (66') horizontally, and by projecting a zone width that corresponds with the width of the kerf 30' to be formed, a readily followed guide for indexing is provided.

Assuming, as indicated in FIG. 4 that a first tubular sawing stroke has been completed to leave a void 68 in the log section 12, together with a chip escape channel 70 formed by the slotting saw 50 during this initial cut, the operator can index for the next cut simply by manipulation of the appropriate control at the operating station to rotate the log section 12 about the chucked axis on which it is supported until the top edge of the previously formed void 68 falls within the adjacent lighting contrast zone 66', so that the following kerf 30' will be cut in intersecting relation to make the necessary provision for chip escape. The width of kerf 30' will normally be in the order of 3⁄8″ and such a width provides an adequate margin for allowing a suitably indexed position to be readily formed by visual reference to the lighting zone 66'.

At the same time, the coordinate lighting zone 64' provides a visual check on the indexed position in relation to the peripheral outline of the log section 12. It will be seen from FIG. 4 that continued indexing of the log section 12 at the same spacing of its supported axis from the sawing axis would align the tubular saw 30 so that its major diameter, as constructed at 30" in FIG. 4, would extend beyond the log section periphery, and upon the next indexing step this condition would be immediately indicated by the vertically oriented lighting zone 64', which would then serve as a guide for lateral shifting of the supporting carriage 26 to space the support axis enough closer to the sawing axis to make a sound cut at this next position. Similarly, the lighting zones 64' and 66' serve to guide indexing in avoidance of internal log section imperfections, and in making a full complement of tubular sawing cuts in reducing the log section 12 to a residual core to the best advantage. Because the lighting zones 64' and 66' are superimposed on the adjacent log section end face, they remain true indications of tubular saw alignment independently of any lack of squareness or smoothness at the viewed end face, and independently of the extent to which the operator's viewing point is parallatic, so that indexing is guided reliably under all practical conditions.

This invention has been described in detail above for purposes of illustration only and is not intended to be limited by this description or otherwise except as defined in the appended claims.

What is claimed is:

1. In the process of cutting cylindrical wooden billets by tubular sawing of the same from a workpiece supported on an axis spaced parallel to the sawing axis and arranged for selective shifting both laterally with said support axis in relation to said sawing axis and rotatively about said support axis for indexing to selected successive positions for sawing, the improvement which comprises the further steps of superimposing at an end face of said workpiece a visible indication of the true location and width of kerf to be formed during a following tubular sawing stroke, and remotely controlling the selective shifting of said workpieces in visual reference to the superimposed indication at said end face.

2. In a tubular sawing apparatus for cutting cylindrical wooden billets in which a workpiece is supported on an axis spaced parallel to the sawing axis and means are provided for selectively shifting the workpiece both laterally with said support axis in relation to said sawing axis and rotatively about said support axis for indexing it to selected successive positions for sawing, the improvement which comprises means for superimposing at an end face of the supported workpiece a visible indication of the true location and width of kerf to be formed during a following tubular sawing stroke and thereby providing a visual reference for guiding remotely controlled selective shifting of said workpiece.

3. In a tubular sawing apparatus, the improvement defined by claim 2 and further characterized in that the visible indication superimposed by said means delineates said kerf location coordinately in relation to said support axis.

4. In a tubular sawing apparatus, the improvement defined by claim 3 and further characterized in that said means is formed by a pair of light projecting units of the type casting a beam that delivers a linear zone of lighting contrast, and said light projecting units are respectively disposed so that the beams therefrom are cast on said workpiece end face to cross the resulting linear contrast zones thereon.

5. In a tubular sawing apparatus, the improvement defined by claim 2 and further characterized in that every structural element of said means is arranged to clear the tubular sawing path.

References Cited
UNITED STATES PATENTS 2,806,492   9/1957   Becker.
3,163,190   12/1964  Ervin _____ 143—85

DONALD R. SCHRAN, Primary Examiner